US 6,973,383 B2

(12) United States Patent
Mitsutani et al.

(10) Patent No.: US 6,973,383 B2
(45) Date of Patent: Dec. 6, 2005

(54) CONTROL APPARATUS AND METHOD FOR AUTOMATICALLY STOPPING AND STARTING INTERNAL COMBUSTION ENGINE MOUNTED IN VEHICLE

(75) Inventors: Noritake Mitsutani, Toyota (JP); Tomoyuki Uchiyama, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 135 days.

(21) Appl. No.: 10/602,733

(22) Filed: Jun. 25, 2003

(65) Prior Publication Data

US 2004/0015285 A1    Jan. 22, 2004

(30) Foreign Application Priority Data

Jul. 17, 2002  (JP)  ............................. 2002-208204

(51) Int. Cl.[7] ............................................. G06G 7/70
(52) U.S. Cl. .................. 701/112; 701/110; 701/113; 701/114; 123/179.3; 123/179.4
(58) Field of Search ..................... 701/110, 112, 113, 701/114, 54; 123/179.3, 179.4

(56) References Cited

U.S. PATENT DOCUMENTS 6,009,371 A    12/1999  Kobayashi
6,251,046 B1 *  6/2001  Yoshino et al. ............. 477/187
6,275,759 B1 *  8/2001  Nakajima et al. ............. 701/54
6,308,129 B1 * 10/2001  Uchida ....................... 701/112

FOREIGN PATENT DOCUMENTS

JP    2001-27146 A    1/2001

OTHER PUBLICATIONS

Chinese Office Action dated Jun. 24, 2005 with English translation.

* cited by examiner

Primary Examiner—Tony M. Argenbright
Assistant Examiner—Johnny H. Hoang
(74) Attorney, Agent, or Firm—Kenyon & Kenyon

(57) ABSTRACT

An engine is automatically stopped when a predetermined amount of time has passed with a predetermined stopping condition being fulfilled, even if learning is not yet complete, when an automatic stopping condition of the engine and a learning execution condition of a control amount of the engine during idling have been fulfilled. However, the engine is prohibited from automatically stopping until the learning is complete when the learning history of the control amount has been cleared by battery disconnection or the like and is not stored. Accordingly, it is possible to both simultaneously control an idling stop when the engine is idling and learn the control amount, as well as minimize a strange sensation felt by the driver that arises from an idling stop not being performed.

14 Claims, 3 Drawing Sheets

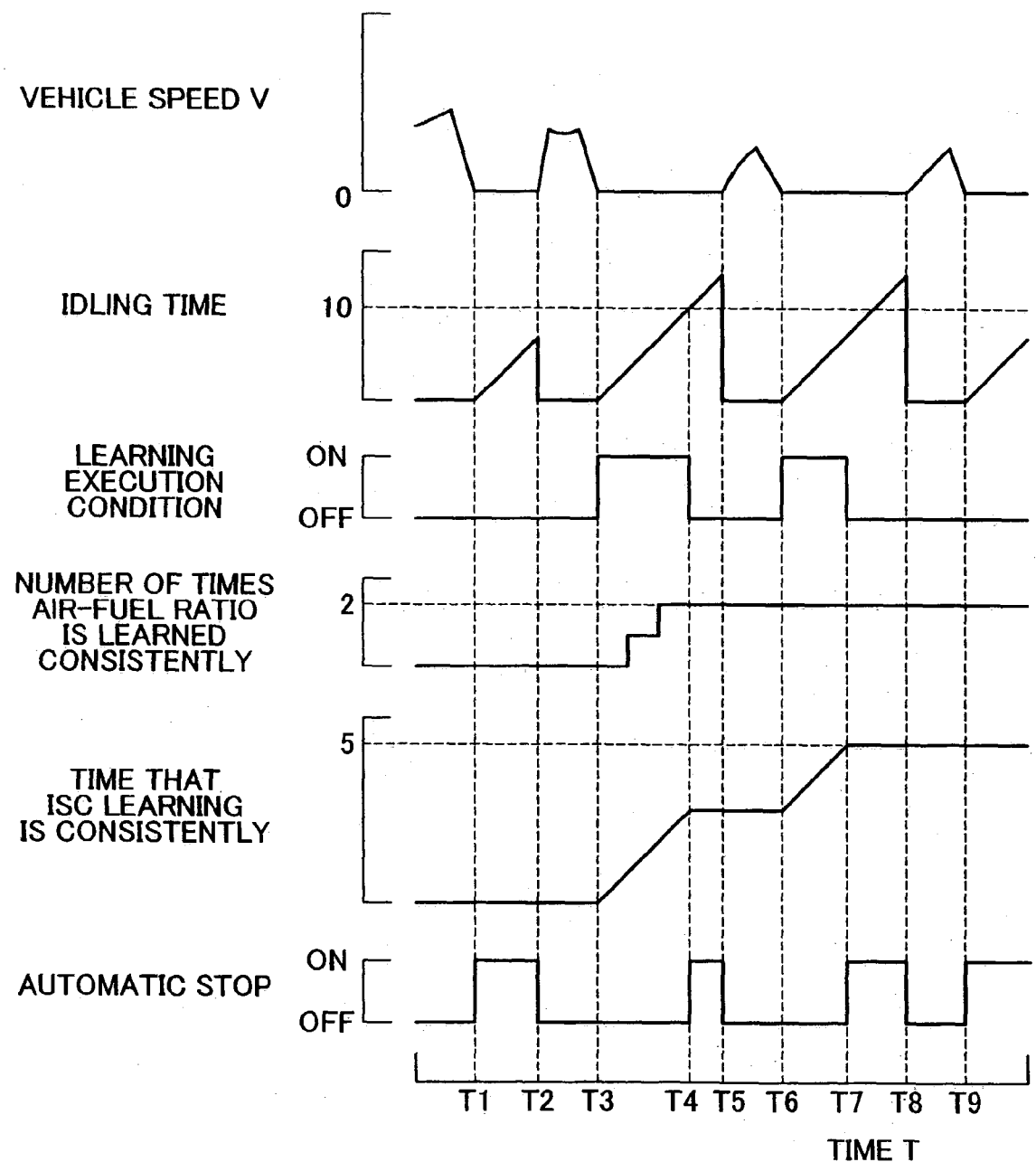

CONTROL APPARATUS AND METHOD FOR AUTOMATICALLY STOPPING AND STARTING INTERNAL COMBUSTION ENGINE MOUNTED IN VEHICLE

INCORPORATION BY REFERENCE

The disclosure of Japanese Patent Application No. 2002-208204 filed on Jul. 17, 2002, including the specification, drawings and abstract is incorporated herein by reference in its entirety.

BACKGROUND OF THE INVENTION

1. Field of the Invention

This invention relates to a control apparatus and method for automatically stopping and starting an internal combustion engine mounted in a vehicle. More specifically, the invention relates to a control apparatus and method for automatically stopping an internal combustion engine mounted in a vehicle when a predetermined stopping condition has been fulfilled while the engine is idling, and automatically starting the internal combustion engine that has been automatically stopped when a predetermined starting condition has been fulfilled.

2. Description of the Related Art

As a control apparatus of this sort, art has been proposed (e.g., Japanese Patent Laid-Open Publication No. 2001-27146) which learns an ignition timing operation amount as a control amount of an internal combustion engine, and whether high-octane or regular gasoline is being used, and automatically stops the internal combustion engine when an idling stop condition has been fulfilled. This apparatus constantly learns the control amount of the internal combustion engine while the internal combustion engine is running, and initializes the learned values (i.e., the results) only when the ignition key is turned on and the engine is started. When the engine is started again after an idling stop, the learned values are not initialized. Accordingly, deterioration in running performance, such as knocking occurring when the engine is restarted after an idling stop, is minimized.

When it is determined whether learning is complete and the internal combustion engine is controlled accordingly, it is also conceivable to construct the engine so that an idling stop would not be performed until the learning is complete. However, when a certain amount of time is required to complete the learning such that an idling stop is not performed immediately, a strange sensation is imparted to the driver.

SUMMARY OF THE INVENTION

It is an object of the invention to simultaneously control automatic stopping and starting when an internal combustion engine mounted in a vehicle is idling and learn a control amount of the internal combustion engine. Further it is another object of the invention to minimize a strange sensation felt by a driver relating to the control for automatically stopping and starting the internal combustion engine that is idling even when a certain amount of time is required to complete the learning of the control amount of the internal combustion engine.

A first aspect of the invention relates to a control apparatus for automatically stopping and starting an internal combustion engine mounted in a vehicle. This control apparatus includes a first controller which, when a predetermined stopping condition has been fulfilled while the engine is idling and a learning execution condition for executing learning of a control amount of the internal combustion engine has been fulfilled, automatically stops the internal combustion engine based on both the completion of learning based on the learning execution condition and the duration of time that has passed after the predetermined stopping condition has been fulfilled; and a second controller which automatically starts the internal combustion engine which has been automatically stopped when a predetermined starting condition has been fulfilled.

According to this control apparatus, in automatically stopping the internal combustion engine when the predetermined stopping condition has been fulfilled while the engine is idling, when the learning execution condition for executing learning of the control amount of the internal combustion engine has been fulfilled, the internal combustion engine is automatically stopped based on both the completion of learning based on the learning execution condition and the duration of time that has passed after the predetermined stopping condition has been fulfilled. The internal combustion engine that has been automatically stopped is then automatically started when the predetermined starting condition has been fulfilled. Therefore, it is possible to simultaneously control automatic stopping and starting when the engine is idling and learn the control amount of the internal combustion engine.

A second aspect of the invention relates to a control method of an internal combustion engine mounted in a vehicle for automatically stopping the internal combustion engine when a predetermined stopping condition has been fulfilled while the engine is idling, and automatically starting the internal combustion engine that has been automatically stopped when a predetermined starting condition has been fulfilled. According to this method, when the learning execution condition for executing the learning of the control amount of the internal combustion engine has been fulfilled, the internal combustion engine is automatically stopped based on both the completion of the learning based on that learning execution condition and a duration of time that has passed after the predetermined stopping condition has been fulfilled.

Accordingly, as described in the first aspect of the invention, it is possible to simultaneously control the automatic stopping and starting of the internal combustion engine when it is idling and learn the control amount of the internal combustion engine.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 shows an example of change over time, when the engine is idling, in i) the idling time, ii) the fulfillment of the learning execution condition, iii) the extent of the air-fuel ratio learning, iv) the extent of the ISC learning, and v) the state of the engine with respect to whether it is automatically stopped.

DETAILED DESCRIPTION OF THE PREFERRED EMBODIMENTS

Figure 1:
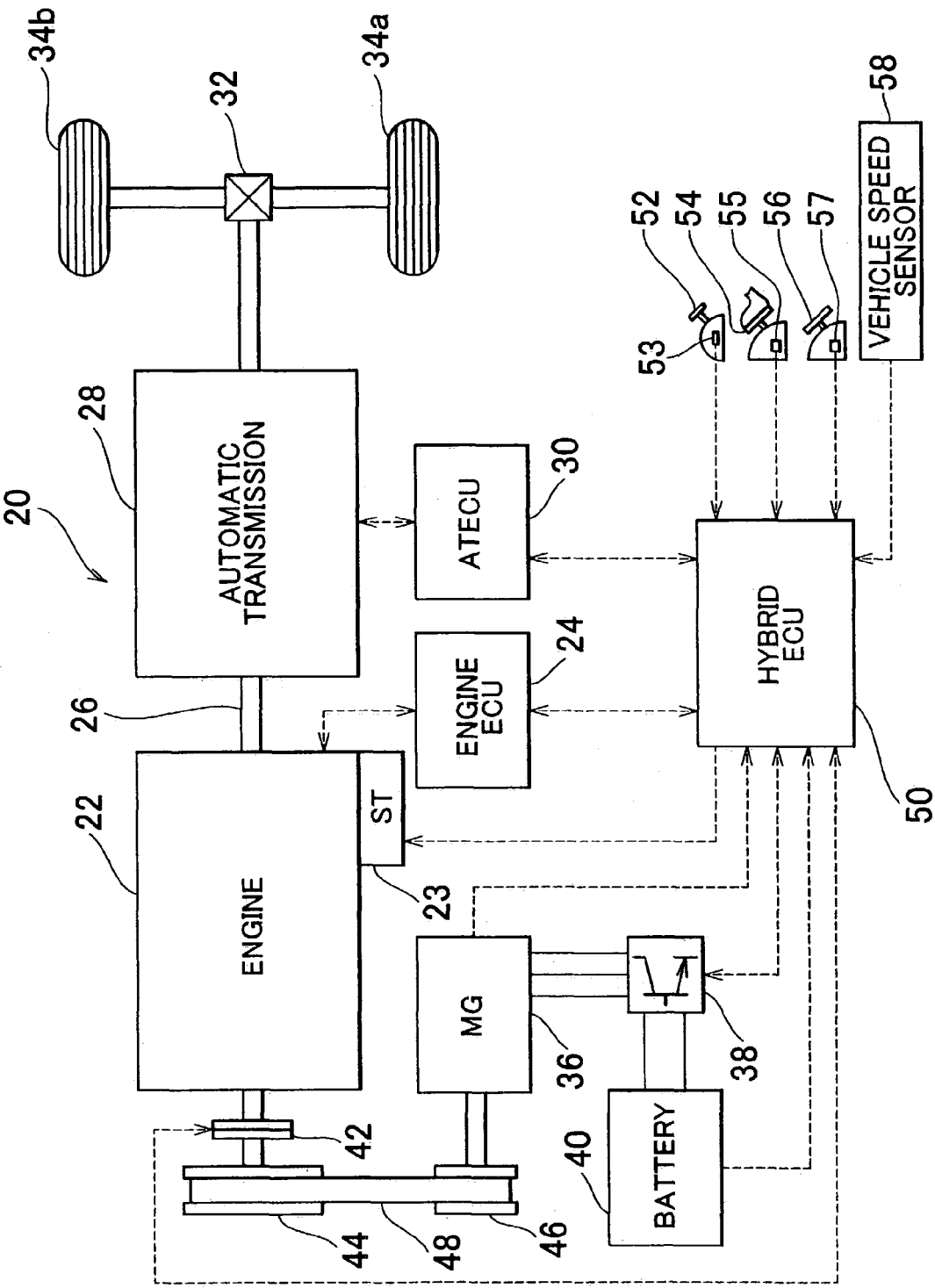
FIG. 1 is a block view schematically showing the configuration of a hybrid vehicle as one exemplary embodiment of the invention.

Next, an exemplary embodiment of the invention will be described. FIG. 1 is a block diagram schematically showing the configuration of a hybrid vehicle 20 as one exemplary embodiment of the invention. As shown in the drawing, the hybrid vehicle 20 includes an engine 22 that is driven using gasoline, an engine electronic control unit (hereinafter referred to as "engine ECU") 24 which controls the engine 22, an automatic transmission 28 which changes the rotation speed output from the engine 22 and transmits power from the engine 22 to driven wheels 34a and 34b via a differential gear 32 at the changed rotation speed, an automatic transmission electronic control unit (hereinafter referred to as "AT ECU") 30 which controls shifting of the automatic transmission 28, a motor generator 36 which both provides and receives power to and from the crankshaft 26 of the engine 22, a battery 40 which both provides and receives power to and from the motor generator 36 via an inverter 38, and a hybrid electronic control unit 50 which controls the starting and stopping of the engine 22, as well as the driving and the like of the motor generator 36.

The motor generator 36 functions as both a motor and a generator, and is, for example, a synchronous motor generator. A motor pulley 46 mounted to a rotating shaft of the motor generator 36 is connected by a belt 48 to an engine side pulley 44 which is in turn connected to the crankshaft 26 of the engine 22 via a clutch 42. Therefore, the motor generator 36 is able to both recharge the battery 40 by generating power using the power output from the engine 22 to the crankshaft 26, as well as output power to the crankshaft 26 using power from the battery 40.

The hybrid electronic control unit 50 comprises a microprocessor which has a CPU as its main component. In addition to the CPU, the hybrid electronic control unit 50 is also provided with ROM for storing processing programs and data and the like, RAM for storing data temporarily, input/output ports, and a communication port, none of which are not shown in the drawing. Various signals are input to the hybrid electronic control unit 50 via the input port. Such signals include signals indicative of a motor speed from a speed sensor and motor temperature from a temperature sensor, both not shown, which are mounted on the motor generator 36; a phase current to the motor generator 36 from a current sensor, not shown, which is mounted inside the inverter 38; a battery temperature from a temperature sensor, not shown, which is mounted to the battery 40; a voltage between terminals and discharging and recharging current from a voltage sensor and a current sensor, respectively, both not shown, which are mounted near an output terminal of the battery 40; a shift position SP from a shift position sensor 53 that detects an operating position of a shift lever 52; an accelerator opening amount Acc from an accelerator pedal position sensor 55 that detects the accelerator opening amount Acc which corresponds to a depression amount of an accelerator pedal 54; a brake pedal position BP from a brake pedal position sensor 57 that detects a depression amount of a brake pedal 56; and a vehicle speed V from a vehicle speed sensor 58. The hybrid electronic control unit 50 also outputs various signals such as a driving signal to the starter motor 23 that cranks the crankshaft 26 of the engine 22, a switching control signal to the inverter 38 for controlling the motor generator 36, and a driving signal to the clutch 42 via the output port. Further, the hybrid electronic control unit 50 is connected via the communication port to the engine ECU 24 and the AT ECU 30, and when necessary, receives data and the like regarding the state of the engine 22 from the engine ECU 24 and data and the like regarding the state of the automatic transmission 28 from the AT ECU 30, and sends control signals to the engine ECU 24 and the AT ECU 30. In this case, in addition to the coolant temperature and engine speed and the like, data related to whether learning of a control value when the internal combustion engine is idling, which is executed by the engine ECU 24, is complete, as well as data regarding the existence of a learning history, is also included in the data related to the state of the engine 22.

With the hybrid vehicle 20 of the configuration according to the exemplary embodiment, basically, idling stop control is performed in which the engine 22 is automatically stopped when a predetermined stopping condition has been fulfilled, such as when the accelerator is OFF, i.e., the accelerator pedal 54 is not being depressed, and the brake is ON, i.e., the brake pedal is being depressed, when the internal combustion engine is idling and an engine speed Ne is equal to, or less than, a predetermined speed. The engine 22 is automatically started by the motor generator 36 when a predetermined starting condition has been fulfilled, such as when the accelerator is ON while the brake is OFF. Hereinafter, operation during an automatic stop of the engine 22 in the idling stop control will be described.

Figure 2:
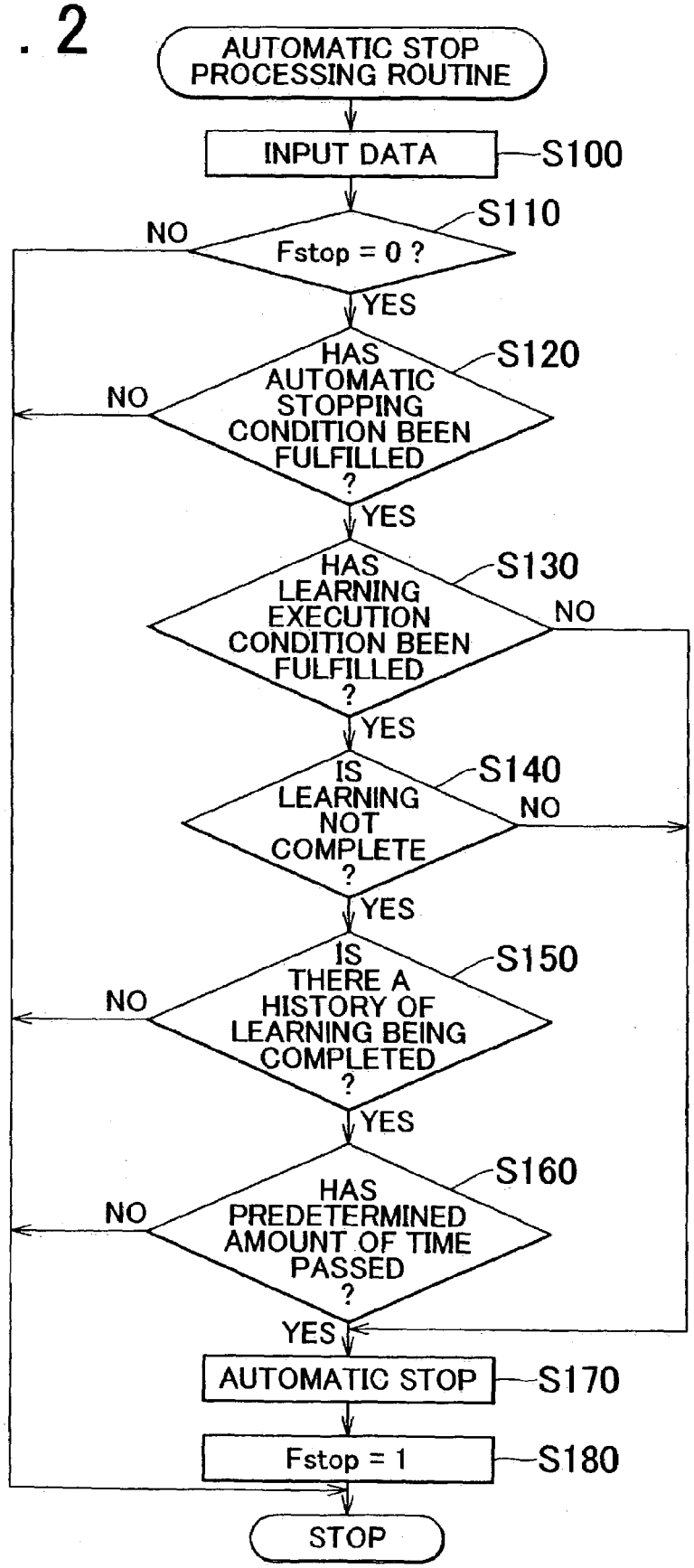
FIG. 2 is a flowchart showing one example of an automatic stop processing routine executed by a hybrid electronic control unit.

FIG. 2 is a flowchart showing one example of an automatic stop processing routine executed by the hybrid electronic control unit 50. This routine is repeated executed at predetermined intervals of time (e.g., every 8 msec). When the routine is executed, the hybrid electronic control unit 50 first inputs the data necessary for the processing (step S100). The data input includes the accelerator opening amount Acc, the brake pedal position BP, the shift position SP, the vehicle speed V, and the engine speed Ne as data for determining the automatic stopping condition, as well as data indicative of whether the learning execution condition for executing learning of control amounts for controlling the engine 22 when the internal combustion engine is idling is fulfilled, whether the learning is complete, and the existence of a learning history, and the like that are sent from the engine ECU 24. Because the determination of the possibility of fulfillment of the learning execution condition sent from the engine ECU 24, and whether the learning is complete, and the existence of a learning history, and the like, as well as the data used for making that determination, is not the focus of this invention, the descriptions thereof will be omitted. In this exemplary embodiment, learning of the relationship between the actual value and the target value in the feedback control for the air-fuel ratio (A/F) (hereinafter referred to as "air-fuel ratio learning"), i.e., the extent of convergence therebetween, and learning of the relationship between the actual value and the target value in the feedback control for an intake air flow rate necessary to maintain idle speed (i.e., ISC (Idle Speed Control)) (hereinafter referred to as "ISC learning"), i.e., the extent of convergence therebetween, are used as the learning of the control amounts of the engine 22 when the engine 22 is idling.

After the data is input (step S100), the value of a flag Fstop is checked to determine whether the engine 22 has been automatically stopped during idling (step S110). When the flag Fstop is a value of "1", it is determined that the engine 22 has been automatically stopped during idling and the routine ends. In this routine, the flag Fstop is set to "1" when the engine 22 is automatically stopped, and is set to "0" when the engine 22 is automatically started by a start processing routine, not shown, when the predetermined starting condition has been fulfilled after the automatic stop.

When the flag Fstop is "0", it is determined whether the learning execution condition, which determines whether or not to execute learning of the control amounts to control the engine 22 during idling, has been fulfilled (step S130). If the learning condition has not been fulfilled, the engine 22 is automatically stopped (step S170), and the flag Fstop is set to "1" (step S180). The routine then ends.

On the other hand, if the learning condition has been fulfilled, it is determined whether learning of the control amounts is complete (step S140). When all of the learning of the control amounts is complete (i.e., in this embodiment, when both the air-fuel ratio learning and the ISC learning are complete), the engine 22 is automatically stopped (step S170) and the flag Fstop is set to "1" (step S180). The routine then ends.

When the learning of the control amounts is not yet complete, whether or not a past history of the learning of the control amounts is stored in the engine ECU 24 is checked (step S150). If a learning history is not stored in the engine ECU 24, the engine 22 is not automatically stopped and the routine ends. Here, the learning history of the control amounts stored in the engine ECU 24 is used as initial values for the control amounts when the engine 22 is running at idle speed. This learning history is cleared at times such as when the battery 40 is replaced. Therefore, the process in which the routine ends without the engine 22 being automatically started when the learning history is not stored in the engine ECU 24 refers to a process in which the engine 22 is prohibited from automatically stopping until learning of the control amounts is complete, during the first learning after the learning history has been cleared such as after the battery 40 has been replaced.

When the learning history of the control amounts is stored in the engine ECU 24, it is determined whether a predetermined amount of time has passed with the automatic stopping condition fulfilled (step S160). If the predetermined amount of time has passed, the engine 22 is automatically stopped (step S170), even if the learning of the control amounts is not yet complete, and the flag Fstop is set to "1" (step S180). The routine then ends. If the predetermined amount of time has not passed with the automatic stopping condition fulfilled, the routine ends without the engine 22 being automatically stopped in order to continue learning of the control amounts.

FIG. 3 shows an example of change over time, when the engine is idling, in i) the idling time, ii) the fulfillment of the learning execution condition, iii) the extent of the air-fuel ratio learning, iv) the extent of the ISC learning, and v) the state of the engine 22 with respect to whether it is automatically stopped. During idling between times T1 and T2, the learning execution condition is not fulfilled so the engine 22 is immediately automatically stopped without the air-fuel ratio learning or the ISC learning being executed. During idling between times T3 and T5, the learning execution condition is fulfilled so the air-fuel ratio learning and the ISC learning are executed until time T4, which is 10 seconds after the engine 22 started idling. In this exemplary embodiment, the air-fuel ratio learning is complete when the difference between the actual feedback value and the target value in each skip of the feedback control is less than 2% two consecutive times. Further, the ISC learning is complete when 5 seconds has passed with the engine speed Ne being within 20 rpm of the target speed and the feedback amount of intake air flow rate is within 0.5 l/s of the target value. It should be noted that the methods for determining whether the air-fuel ratio learning and the ISC learning are complete are not limited to those described above, but that various methods may of course be used. During idling between times T3 and T5, although the air-fuel ratio learning is complete at time T4, which is 10 seconds after the engine 22 started idling, the ISC learning is not complete. However, because the engine 22 has been idling for 10 seconds, the ISC learning is canceled and the engine 22 is automatically stopped. As a result, it is possible to minimize a strange sensation felt by the driver that arises from the engine 22 not automatically stopping because idling stop control was not executed. During idling between times T6 and T8, the ISC learning, which was cancelled, is again started and the engine 22 is automatically stopped at time T7, when the ISC learning is complete.

According to the hybrid vehicle 20 of the exemplary embodiment described above, the engine 22 is automatically stopped if the predetermined amount of time has passed with the predetermined stopping condition fulfilled even if the learning of the control amounts of the engine 22 is not complete. Therefore, it is possible to minimize a strange sensation felt by the driver that arises from the engine 22 not automatically stopping until the learning is complete, i.e., it is possible to avoid giving the driver the strange sensation that the idling stop control will not be performed. In addition, it is also possible to minimize deterioration in fuel consumption due to the engine 22 not being automatically stopped. Also with the hybrid vehicle 20 according to this exemplary embodiment, the engine 22 is immediately automatically stopped when the learning execution condition is not fulfilled when the engine 22 is idling so fuel consumption can be improved. Furthermore, with the hybrid vehicle 20 according to the exemplary embodiment, the engine 22 is prohibited from automatically stopping until the learning is complete when no learning history is stored in the engine ECU 24. As a result, the engine 22 runs stably during subsequent idling.

With the hybrid vehicle 20 according to this exemplary embodiment, the motor generator 36 is provided in addition to the starter motor 23, and the engine 22 that is in an idling stop is automatically started by the motor generator 36. Alternatively, however, the motor generator 36 may be omitted and the engine 22 that is in an idling stop may be automatically started by the starter motor 23.

With the hybrid vehicle 20 according to this exemplary embodiment, the air-fuel ratio learning and the ISC learning is performed as the learning of the control amounts for controlling the engine 22 when it is idling. The invention is not limited to these, however. As long as the learning is of control amounts of the engine 22, various other learning, such as learning of the ignition timing and learning of the opening and closing timing of the intake and exhaust valves, may be performed for example.

With the configuration of the hybrid vehicle 20 according to this exemplary embodiment, the motor generator 36 is attached to the crankshaft 26 of the engine 22 by the belt 48. Alternatively, however, as long as the engine 22 can be automatically stopped and started, various other configurations may be used. For example, the hybrid vehicle may be configured as a so-called parallel hybrid vehicle, in which some of the power from the engine is transmitted to the axles and the rest of the power is converted into electrical energy that is then used to recharge a secondary battery or supplied to a generator mounted on the axle side. Alternatively, the hybrid vehicle may be configured as a so-called series hybrid vehicle, in which all of the power from the engine is converted into electrical energy that is used to recharge the secondary battery and the vehicle runs using the power from this secondary battery. Alternatively, the configuration may also be that of a vehicle other than a hybrid vehicle. Also, in this case, the automatic transmission may be any type of transmission, or a transmission such as an automatic transmission may not even be provided at all.

Although the invention has been described herein with reference to specific embodiments, many modifications and variations therein will readily occur to those skilled in the art. Accordingly, all such variations and modifications are included within the intended scope of the invention. Further, this invention can be implemented with further variations and modifications.

What is claimed is:

1. A control apparatus for automatically stopping and starting an internal combustion engine mounted in a vehicle, comprising:
   a first controller which, when a predetermined stopping condition has been fulfilled while the engine is idling and a learning execution condition for executing learning of a control amount of the internal combustion engine has been fulfilled, automatically stops the internal combustion engine based on both the completion of learning based on the learning execution condition and a duration of time that has passed after the predetermined stopping condition has been fulfilled; and
   a second controller which automatically starts the internal combustion engine which has been automatically stopped when a predetermined starting condition has been fulfilled.

2. The control apparatus according to claim 1, wherein the first controller automatically stops the internal combustion engine when the learning based on the learning execution condition is complete, regardless of the duration of time that has passed after the predetermined stopping condition has been fulfilled.

3. The control apparatus according to claim 1, wherein the first controller automatically stops the internal combustion engine when the stopping condition has continued to be fulfilled for a predetermined period of time, when the learning based on the learning execution condition is not complete.

4. The control apparatus according to claim 1, wherein the first controller automatically stops the internal combustion engine when the learning execution condition has not been fulfilled, regardless of the duration of time that has passed after the predetermined stopping condition has been fulfilled.

5. The control apparatus according to claim 1, wherein the control amount of the internal combustion engine to be learned is a plurality of control amounts, and completion of the learning is the completion of all of the learning of the plurality of control amounts to the learned.

6. The control apparatus according to claim 5, wherein the plurality of control amounts includes at least one of an air-fuel ratio and an intake air flow rate necessary for maintaining idle speed.

7. The control apparatus according to claim 1, wherein the first controller prohibits the internal combustion engine from automatically stopping when there is no history of the learning based on the learning execution condition being completed, regardless of the duration of time that has passed after the predetermined stopping condition has been fulfilled.

8. A control method of an internal combustion engine mounted in a vehicle, comprising:
   determining whether a predetermined stopping condition for automatically stopping the internal combustion engine during idling has been fulfilled;
   determining whether a learning execution condition for executing learning of a control amount of the internal combustion engine has been fulfilled, when it has been determined that the predetermined stopping condition has been fulfilled;
   determining whether the learning based on the learning execution condition is complete;
   measuring a duration of time that has passed after the predetermined stopping condition has been fulfilled;
   automatically stopping the internal combustion engine based on both the completion of the learning based on the learning execution condition and the duration of time that has passed after the predetermined stopping condition has been fulfilled, when it has been determined that the learning execution condition has been fulfilled;
   determining whether a predetermined starting condition for starting the internal combustion engine that has been automatically stopped has been fulfilled; and
   automatically starting the internal combustion engine when the predetermined starting condition has been fulfilled.

9. The control method according to claim 8, wherein the internal combustion engine is automatically stopped when it has been determined that the learning based on the learning execution condition is complete, regardless of the duration of time that has passed after the predetermined stopping condition has been fulfilled.

10. The control method according to claim 8, wherein the internal combustion engine is automatically stopped when the stopping condition has continued to be fulfilled for a predetermined period of time, when it has been determined that the learning based on the learning execution condition is not complete.

11. The control method according to claim 8, wherein the internal combustion engine is automatically stopped when it has been determined that the learning execution condition has not been fulfilled, regardless of the duration of time that has passed after the predetermined stopping condition has been fulfilled.

12. The control method according to claim 8, wherein the control amount of the internal combustion engine to be learned is a plurality of control amounts, and completion of the learning is the completion of all of the learning of the plurality of control amounts to the learned.

13. The control method according to claim 12, wherein the plurality of control amounts includes at least one of an air-fuel ratio and an intake air flow rate necessary for maintaining idle speed.

14. The control method according to claim 8, further comprising the step of:
   determining whether there is a history of the learning based on the learning execution condition being completed,
   wherein the internal combustion engine is prohibited from automatically stopping when it has been determined that there is no history of the learning based on the learning execution condition being completed, regardless of the duration of time that has passed after the predetermined stopping condition has been fulfilled.

* * * * *